No. 789,529. PATENTED MAY 9, 1905.
N. F. H. DREYER.
TIN PACKING FOR MILK, CREAM, OR THE LIKE.
APPLICATION FILED MAR. 25, 1904.
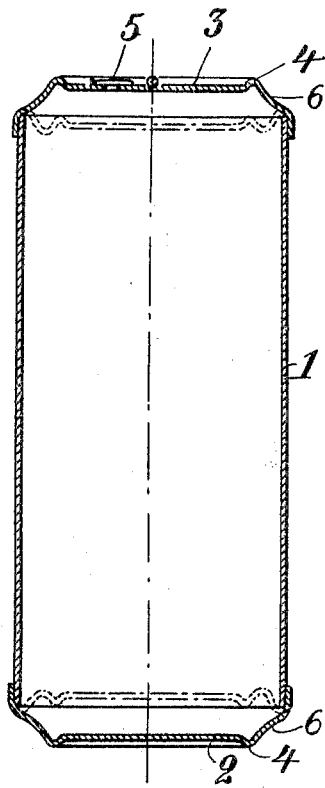
WITNESSES:
W. M. Avery
A. E. Fay.
INVENTOR
Niels F. H. Dreyer
BY
Munn
ATTORNEYS.

No. 789,529. Patented May 9, 1905.

UNITED STATES PATENT OFFICE.

NIELS FREDERIK HENRIK DREYER, OF AARHUS, DENMARK.

TIN PACKING FOR MILK, CREAM, OR THE LIKE.

SPECIFICATION forming part of Letters Patent No. 789,529, dated May 9, 1905.

Application filed March 25, 1904. Serial No. 199,914.

*To all whom it may concern:*

Be it known that I, NIELS FREDERIK HENRIK DREYER, a citizen of the Kingdom of Denmark, and a resident of Aarhus, Jutland, Denmark, have invented new and useful Improvements in Tin Packings for Milk, Cream, or the Like, of which the following is a specification.

My invention relates to the manufacture of tin packings which are so constructed that the usual air-space inside the tin packing is avoided. It is well known that by pasteurizing the milk or cream in the tins and subsequent soldering of the lid the cooling and corresponding contraction of the liquid forms an air-space between the lid and the liquid. When such a tin is opened after having been subject to a railway journey or other shaking conveyance, a part of the cream is transformed to butter. In order to prevent this, the air-space must be avoided, and this may be done by using tins as shown in the accompanying drawing.

1 is a cylinder with a bottom 2 and a lid 3. The bottom and the lid are provided with corrugations 4 and inwardly-curved edges. The tins are filled with raw cream or milk and the lids soldered on. The tins are then placed in a heating-chamber and sterilized. After the sterilization and subsequent cooling the air is sucked out of the chamber, and as the lids are provided with small valves 5 the air is also sucked out of the tin. When air again is admitted to the chamber, all the small valves will close, and the atmospheric pressure will press the bottom and lid together, as shown with dotted lines. The air-space over the liquid will thereby be avoided. For the purpose of permitting this action to readily take place the ends are provided with inwardly-curved portions 6. These permit this contraction. If they were straight, a greater force would have to be exerted in causing them to buckle before the ends could move inwardly. Afterward the valves are soldered in the usual way.

Having now described my invention, what I claim as new, and desire to secure by Letters Patent, is—

1. A metallic packing vessel having a projecting end provided with a corrugation extending around the end, and an inwardly-curved portion between the corrugation and the edge of the end.

2. A packing vessel having a normally projecting end provided with a corrugation extending around it at a distance from the edge and an inwardly-curved portion between the corrugation and the edge, said end being capable of being pressed inward by atmospheric pressure, and an outwardly-opening valve mounted on said end.

3. A cylindrical metallic packing vessel having a circular projecting top and bottom, each being provided with a circular corrugation at a distance from its edge, and an inwardly-curved portion between the corrugation and the edge.

Signed by me at Copenhagen this 2d day of March, 1904.

NIELS FREDERIK HENRIK DREYER.

Witnesses:
 W. BLICHFUR,
 WILHELM KANNPFF.